(No Model.)
J. HARGREAVES.
PROCESS OF OBTAINING MOTION FROM HEAT PRODUCED BY LIQUID OR GASEOUS FUEL.
No. 401,162. Patented Apr. 9, 1889.
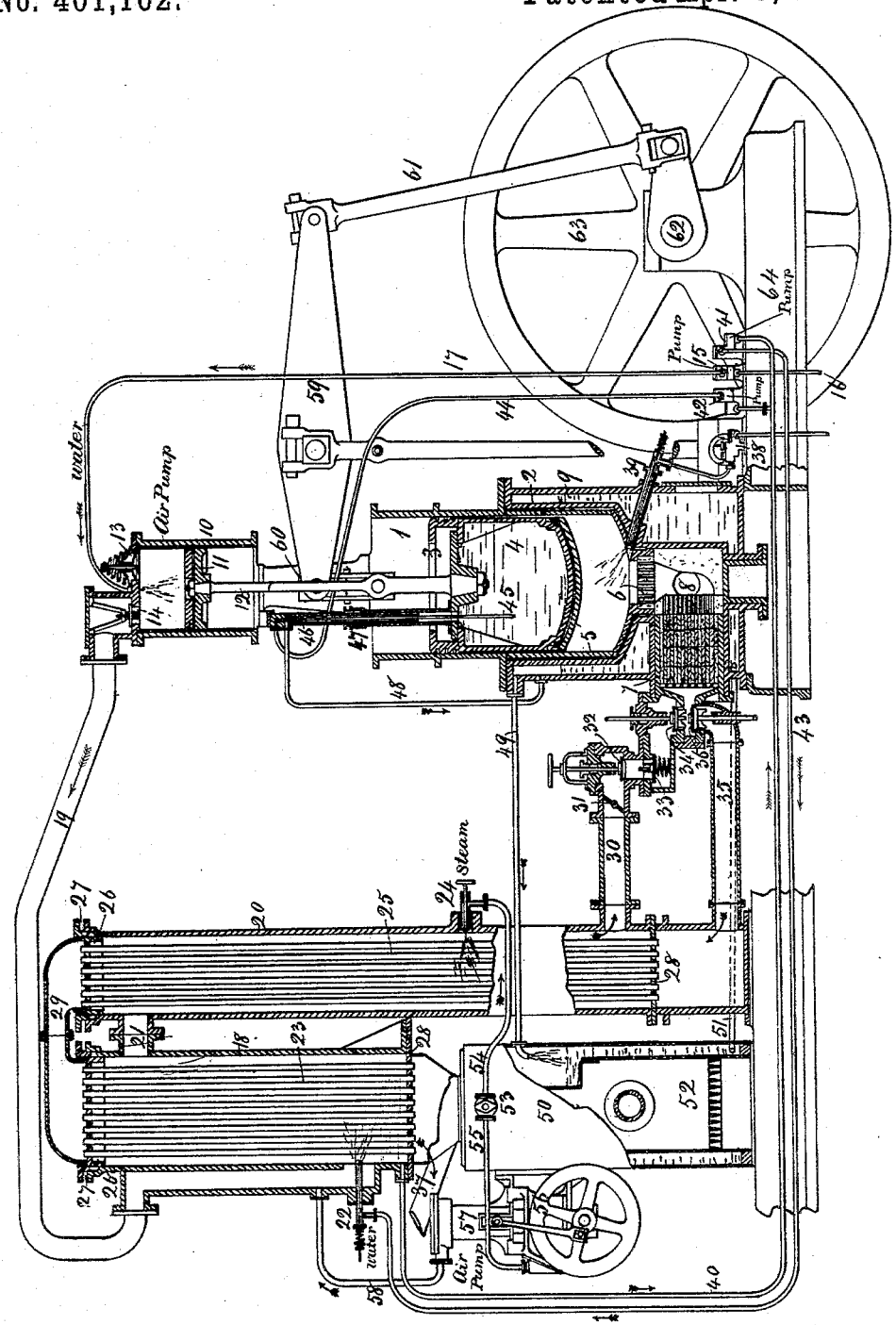
Witnesses.
Inventor.
James Hargreaves,

UNITED STATES PATENT OFFICE.

JAMES HARGREAVES, OF FARNWORTH, COUNTY OF LANCASTER, ENGLAND.

PROCESS OF OBTAINING MOTION FROM HEAT PRODUCED BY LIQUID OR GASEOUS FUEL.

SPECIFICATION forming part of Letters Patent No. 401,162, dated April 9, 1889.

Application filed April 4, 1888. Serial No. 269,532. (No model.) Patented in England July 26, 1882, No. 3,540, and April 15, 1887, No. 5,485; in France February 6, 1883, No. 153,536, and December 5, 1887, No. 187,401; in Belgium February 7, 1883, No. 60,385, and December 6, 1887, No. 79,827; in Italy March 31, 1883, No. 15,185, and November 30, 1887, No. 22,711; in Spain April 12, 1888, No. 12,328, and in Canada August 23, 1888, No. 29,736.

*To all whom it may concern:*

Be it known that I, JAMES HARGREAVES, of Farnworth, in the county of Lancaster, England, have invented a new and useful Process for Obtaining Motion from Heat Produced by the Combustion of Liquid or Gaseous Fuel and Air, (for which I have obtained Letters Patent in Great Britain, No. 5,485, April 15, 1887, and No. 3,540, July 26, 1882; in France, No. 153,536, February 6, 1883, and No. 187,401, December 5, 1887; in Belgium, No. 60,385, February 7, 1883, and No. 79,827, December 6, 1887; in Italy, No. 15,185, March 31, 1883, and No. 22,711, November 30, 1887; in Spain No. 12,328, April 12, 1888, and in Canada, No. 29,736, August 23, 1888;) and I do hereby declare the following to be a full, clear, and exact description thereof.

The invention relates to an improved process for obtaining motion from heat produced by the combustion of liquid or gaseous fuel and air.

The objects are so to conduct and carry on the combustion of liquid and gaseous fuel and air that the heat produced thereby shall be almost entirely converted into motion.

Under my invention I cause the liquid or gaseous fuel and air in combination with water to react on each other in the following novel manner: I mix air and water under pressure and heat the mixture until the said air is saturated with water-vapor. I superheat the saturated air and add thereto water in the form of steam and superheat the mixture. I raise the temperature of the saturated and superheated mixture to a red heat and bring it into contact with liquid or gaseous fuel, so as to produce combustion, and I utilize part of the heat obtained by combustion to expand the products of combustion and produce motion, and part to effect the heating of the air and water, as above set forth.

I will describe my invention with reference to the accompanying drawing, which shows in vertical longitudinal section a motor constructed and operating in accordance with the principles of my invention.

In the drawing, 1 is the working-cylinder. 2 is the combustion-chamber; 3, piston; 4, hollow base of piston; 5, heat-receiving walls to combustion-chamber and piston-base; 6, hearth; 7, regenerator; 8, opening; 9, water-jacket; 10, air-pump; 12, rod connecting the main piston 3 with the air-pump piston 11; 13, suction-valve; 14, delivery-valve; 15, water-pump; 16, suction-pipe; 17, delivery-pipe; 18, saturating-chamber; 19, pipe or way leading from the air-pump 10 to the saturating-chamber 18; 20, superheating-chamber; 21, pipe or way connecting the chambers 18 and 20; 22, water-injector; 23, tubes in chamber 18; 24, steam-injector; 25, tubes in chamber 20; 26, upper tube-plates; 27, stuffing-boxes; 28, lower tube-plates; 29, hood connecting the tubes 23 and 25; 30, way from the chamber 20 to the regenerator 7; 31, throttle-valve; 32, stop-valve; 33, non-return valve; 34, inlet-valve; 35, way leading from the regenerator 7 to the tubes 25; 36, exhaust-valve; 37, chimney or flue; 38, pump for liquid or gaseous fuel; 39, fuel-injector; 40, pipe leading from the chamber 18 to pumps 41 and 42; 43, pipe leading from the pump 41 to the injector 22; 44 45, pipes leading from the pump 42 to the interior of the piston-base 4; 46, pipe surrounding the pipe 45; 47, stuffing-box; 48, pipe connecting the pipe 46 with the jacket 9; 49 51, pipes leading from the jacket 9 to the vessel 50; 52, furnace; 53, valve connected to the chamber 50; 54, pipe leading from the valve 53 to the injector 24; 55, pipe leading from the valve 53 to the steam-engine 56; 57, air-pump actuated by the steam-engine 56; 58, pipe leading from the air-pump 57 to the chamber 18; 59, beam coupled to the piston-rod 12 by links 60; 61, connecting-rod; 62, crank-shaft; 63, fly-wheel; 64, base-plate and framing.

The various moving parts—such as pumps, governors, and inlet and exhaust valves—receive motion from the beam and shaft through gearing in any usual way. The engine 56 and air-pump 57 are used in starting the apparatus, which is done as follows: I attach a portable furnace to the opening 8, and allow the products of combustion from the said furnace to pass through the regenerator 7 and exhaust-valve 36 and tubes 25 and 23 to the chimney or flue until the hearth 6 becomes red-hot. I heat the vessel 50, by means of the furnace 52, until steam is formed in the said vessel 50, and the water in the jacket 9 is heated by circulation. I then open the valve 53, so as to allow steam from the vessel 50 to actuate the engine 56, give motion to the pump 57, and force air into the saturator 18 and superheater 20 until sufficient pressure is obtained to start the motor. I now close the opening 8 and open the stop-valve 32. The air enters the chamber 2 and gives motion to the piston 3 and its connections. The valve 53 is now turned, so as to shut off steam from the engine 56 and allow it to pass by the pipe 54 to the injector 24. It will be evident that the regenerator and furnace must be sufficiently heated before the steam is allowed to flow from the jacket to the engine. The apparatus being now in motion, the following actions take place. During the downstroke of the piston 3 air is drawn into the pump 10 and the products of combustion in the cylinder 1 and chamber 2 are expelled through the hearth 6, regenerator 7, and tubes 25 and 23 to the chimney or flue, and as the piston reaches the bottom of the stroke the pump 38 forces liquid or gaseous fuel through the injector 39 into the chamber as soon as the exhaust-valve 36 is closed. The inlet-valve 34 is now opened, air and water-vapor enter the combustion-chamber, mix with the fuel, and are burned. The inlet-valve 34 is now closed and the heated products of combustion force the piston to the top of its stroke. During the upstroke of the piston 3 water is injected into the air-pump 10 by the water-pump 15, and the air and water mixed are forced out of the pump 10 into the saturator and superheaters 18 and 20. The pumps 41 and 42 are also actuated and cause water to be circulated by the pump 41 from the saturator 18 to the injector 22, and by the pump 42 from the saturator 18 through the piston 3 and jacket 9 to the vessel 50, whence the said water passes in the form of steam through the injector 24 into the chamber 20.

It will be observed that motion is given to the main piston 3 of the above apparatus by the following sequence of operations: Air is compressed and mixed with water in the pump 10 and saturator 18, where it absorbs a large portion of the heat remaining in the products of combustion passing to the chimney; the saturated air is mixed with steam and superheated in the superheater 20; the saturated and superheated mixture is raised to a red heat while passing through the regenerator 7 and hearth 6, and the red-hot mixture is brought into contact with liquid or gaseous fuel in the combustion-chamber 2. Part of the heat generated by the combustion is utilized in expanding the products of combustion and giving motion to the piston. Part of the heat is utilized in raising the temperature of the water and steam mixed with the incoming air and in heating the mixture of air and water spray while a small proportion of the heat escapes up the chimney or flue.

I claim—

1. The method hereinbefore described of treating the air which is supplied to the combustion-chamber of an internal-combustion motor, which consists in mingling aqueous vapor with the air, heating the same until the air is saturated with aqueous vapor, then mingling the saturated air with steam and superheating the same preparatory to bringing the air into contact with the liquid or gaseous fuel in the combustion-chamber, substantially as and for the purposes described.

2. The method hereinbefore described of treating the air which is supplied to the combustion-chamber of an internal-combustion motor, which consists in saturating air with water under pressure, mixing the thus saturated air with steam, superheating the resulting product and raising the same to a high degree of heat prior to bringing the same into contact with the other fuel, and thereafter utilizing the products of combustion for heating the water and air, substantially as described.

In testimony whereof I, the said JAMES HARGREAVES, have hereunto set my hand.

JAMES HARGREAVES.

Witnesses:
J. KING,
W. B. JOHNSON.